April 7, 1970 H. J. WHITEHOUSE 3,505,657

TORSIONAL DELAY LINE AND IMPRESSED FLUX LINKAGE INTERACTION DEVICE

Filed July 20, 1965

INVENTOR.
HARPER J. WHITEHOUSE
BY
V. C. MULLER
ATTORNEY.

United States Patent Office 3,505,657
Patented Apr. 7, 1970

3,505,657

TORSIONAL DELAY LINE AND IMPRESSED FLUX LINKAGE INTERACTION DEVICE

Harper J. Whitehouse, Hacienda Heights, Calif., assignor to the United States of America as represented by the Secretary of the Navy Filed July 20, 1965, Ser. No. 474,538
Int. Cl. G11c *11/12;* H03h *9/30;* H01v *9/00*
U.S. Cl. 340—174 8 Claims

ABSTRACT OF THE DISCLOSURE

An elongated element, generally a wire, of magneto-elastic material, which is annealed or work-hardened to increase the stress-sensitivity characteristics from one end to the other, thus compensating for attenuation effects and providing for a greater linearity of operation. The delay line is one of the main components in a system for the generation or detection of binary pulse codes, even long codes, having, for example, over five hundred digits.

The invention described herein may be manufactured and used by or for the Government of the United States of America for governmental purposes without the payment of any royalties thereon or therefor.

This invention relates to improvements in torsional delay line apparatus of the type disclosed in the inventor's copending patent application, Ser. No. 333,241, entitled "Delay Line Signal Detector," filed Nov. 24, 1963, now Patent No. 3,290,649. In that type of device a torsional impulse wave interacts with a plurality of individual flux linkages impressed upon different axial portions of the delay line wire to generate elemental induced voltage impulses. These elemental induced voltage impulses are then utilized sequentially or simultaneously, depending upon the use to which the device is put, to form the device's output signal. The invention is of particular utility where this type of a delay line device is used for the generation or detection of lengthy binary pulse codes having the order of one hundred or more digits.

The apparatus described in the cited copending application is satisfactory for many applications. However, a disadvantage in its operation is that the contribution to the output attributable to an axial section of the line is less, the further the section is from the launch end of the line. This is due to the attenuation experienced by the torsional wave as it travels down the line. The resultant nonlinearity in the device's operation causes decreased bandwidth and limits the length of line that may be effectively employed as a single unit.

Accordingly, an object of the invention is to provide an improved torsional delay line device, of the type referred to, which provides a greater linearity in its operation than heretofore possible in the prior art.

Another object is to provide a device in accordance with the previous objective, which requires no additional parts, and is relatively easy to manufacture.

Figure 1:
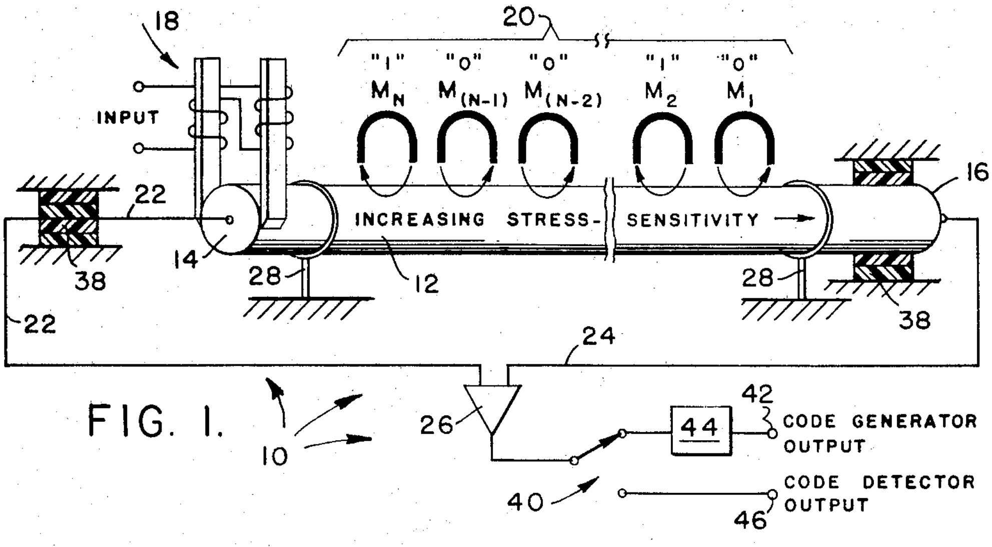
Figure 2:
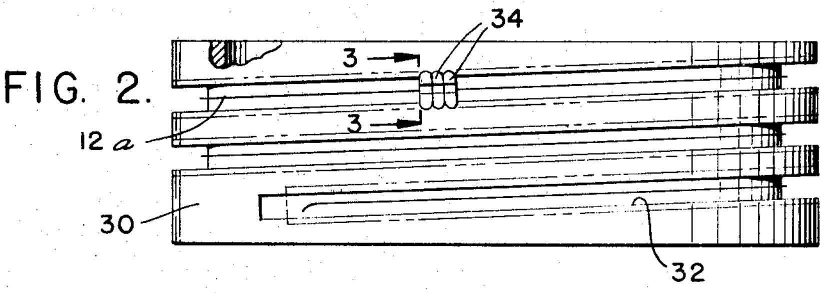
Figure 3:
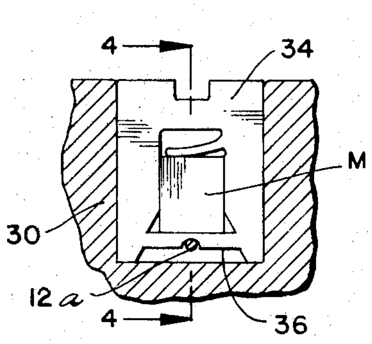
Figures 4, 6:
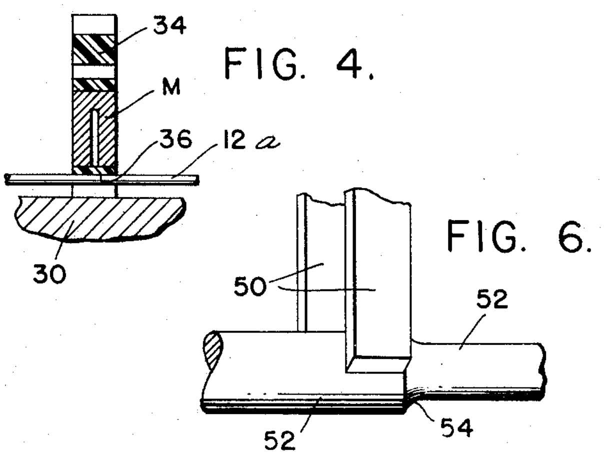
Figure 5:
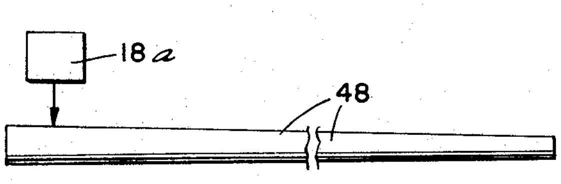

Other objects and many of the attendant advantages of this invention will be readily appreciated as the same becomes better understood by reference to the following detailed description when considered in connection with the accompanying drawings wherein:

FIG. 1 is a schematic of a torsional delay line device embodying the present invention, FIG. 2 is a side elevation of one form of construction of the device of FIG. 1, certain parts being omitted to expose the delay line wire, FIG. 3 is an enlarged section taken along line 3—3 of FIG. 2, FIG. 4 is a section taken along line 4—4 of FIG. 3, FIG. 5 is a diagrammatic view of a form of delay line wire used in an alternate form of invention, the taper shown being exaggerated for purposes of illustration, and FIG. 6 illustrates further alternate form of invention.

Referring now to the drawing, and in particular to FIG. 1, a delay line device 10 is essentially the same as that disclosed in the cited copending application, *except* that delay line wire 12 exhibits monotonically increasing stress-sensitivity at its different cross sections in the direction away from the input end 14 of the wire, as shown by legend. The term "stress-sensitivity" as used herein, refers to that quality described by the mathematical expression:

Stress-sensitivity$=\Lambda=(B_\sigma/\sigma)=0$ wherein, $\sigma$ is a small stress, and $B_\sigma$ is the change in induction corresponding to the small stress.

This quality, and the mathematical expression by which it is defined, is more fully described at pages 613 to 619, Ferromagnetism, by R. M. Bozorth, published by Van Nostrand, 1951. It is to be noted that FIG. 1 shows only the short segments of the wire adjacent its input end 14 and to its terminal end 16. The wire is in fact a relatively long span, and may be in the form of the helically wound wire 12*a*, FIG. 2, to be more fully described later in this specification. The wire is made of conventional magneto-elastic material normally used for torsional delay lines. The desired increase in stress-sensitivity in the direction away from its input end may be produced by employing an annealing step in the process of its manufacture, and controlling the temperature at which the different axial portions along its length are annealed. An increase in the temperature of annealing produces an increase of stress-sensitivity. Thus, the direction of increasing stress-sensitivity shown in the legend corresponds to that in a wire which has been processed with the temperature of annealing increased in the direction away from its input end. Alternatively, the desired variation in stress-sensitivity may be achieved by employing a work hardening step in its manufacture, and varying the amount of work hardening which is impressed upon the wire at the different axial portions therealong. This is in accordance with known principles of the relationship of stress-sensitivity to degree of work hardening.

Other parts of device 10 include a magnetostrictive ribbon type torquer 18, which is coupled to wire 12 adjacent its input end 14, and which serves to convert an electrical signal into a torsional strain wave. A set 20 of U-shaped reference magnets are disposed along the span of wire with their pole pieces in perpendicular juxtaposed relationship to the span of wire. The device 10 is employed to either generate or detect a binary pulse code. A binary pulse code is a serial wave train of binary impulses, these impulses consisting of one or the other of a binary pair of forms of wave impulse. One of the pair of forms of binary impulse represents a zero (0) digit, and the other represents a one (1) digit. The total characteristic of the wave train of these impulses consists of a predetermined sequential order of a predetermined number, *n*, of these impulses, and corresponds to a predetermined sequence of binary digits. The predetermined binary sequence 0, 1 . . . 0, 0, 1 shall be used for illustrative purposes in this specification. For sake of brevity, only the first two and last three digits of the code are given, it being understood that such pulse codes typically represent binary sequences containing a number of binary digits of the order of one hundred or more. The larger the number of digits in the pulse code, the greater the potential sensitivity and selectivity of a communication system employing the code. Set of magnets 20 comprises individual magnets $M_1$, $M_2$ . . . $M_{(n-1)}$, M. Each individual magnet forms an individual flux circuit station which impresses a field of flux linkages upon a corresponding axial portion of the wire, and each impressed field of flux linkage includes a unidirectional, generally axial component. For further details of the flux linkage circuits, reference is made to the cited copending application.

The individual magnets representing a zero digit are oriented with their north pole pieces nearest the input end 14, and those representing a one digit with their north pole pieces nearest the terminal end. The arrangement of magnets $M_1$ . . . $M_n$ for the above recited binary sequence consists of disposing the magnets in the successive order of the sequence in the direction away from the terminal end 16. Thus, the magnet $M_1$, next to terminal end 16, is oriented with its north pole piece nearest the input end, the adjacent magnet $M_2$ with its north pole piece nearest the terminal end, etc. It is to be noted that such an arrangement provides a disposition of the magnets in which the array of magnets are reversed in order from that of the reference binary sequence, in the direction of wave propagation along the delay line.

A pair of electrical leads 22 and 24 connect wire 12's input and terminal ends, respectively, to the input of an amplifier 26. Wire 12 is supported along its span by suitable generally non-rigid supports 28, shown schematically in FIG. 1. One method of supporting the wire in a helical form of span is by means of a rigid annular frame 30, FIG. 2, having a helical groove 32 formed in its outer surface. Individual plastic frames 34, FIGS. 4 and 5, for holding each magnet M are transversely fitted into the channel. The wire 12 is supported between a suitably undercut and notched bottom edge 36 of each frame 34, and the bottom of the groove. Rigidity of structure is obtained by a tight fit between the metal parts and the plastic frame structure. The undercut and notched bottom edge 36 of each frame 34 is shaped to provide a point source support force against the resilient wire 12*a* in the generally radially inward direction. The electrical lead wire 22, and the terminal end 16 of wire 12, are suitably damped against undesired acoustic wave reflections by suitable damping structures 38, FIG. 1, shown schematically.

A two position switch 40, alternatively connects amplifier 26 to a code generator mode output terminal 42 through a signal wave reversal device 44, or directly to a detector mode output terminal 46. Signal wave reversal device 44 may, for example, comprise a recirculation delay line and an associated precessional sampling circuit. The sampling circuit samples the recirculation delay line in a synchronously timed relationship such that the sampled portions of the wave regularly precess in a direction reverse to that of their sequential appearance in the input wave. The resultant output of device 42 is a signal wave having a time-impulse characteristic which is the reverse of that at its input. By employing a signal wave reversal device of this type, the output signal at terminal 42 can be detected by applying same to the normal input end of device 10. This permits a single device 10 to be used as both the generator and a detector of a pulse code. This is particularly desired in echo-ranging systems.

The need for the signal wave reversal device 40 may be eliminated by employing two devices like 10, one as the code generator and one as the code detector. Where two devices are employed, the device for generating the code would have its predetermined sequence of magnet polarities, representing the binary code sequence, arranged in the direction away from the input end of the line, rather than in the direction away from the terminal end of the line. The device for detecting the code would be just like device 10, i.e. it would have the sequence of polarities arranged in the direction away from the terminal end.

The operation of device 10 to generate a serial binary pulse code signal will now be described. A single torsional strain impulse is launched along wire 12 by torquer 18. Thus, the strain impulse is propagated along the wire in the direction in which its stress-sensitivity increases. Device 10 operates essentially in the same manner as explained in the cited copending application, except that the magnitudes of flux linkages at the different magnet stations increase with increase of the wire's stress-sensitivity. (Although the explanation in the copending application relates mainly to the use of the device as a signal detector, its use as a code generator is disclosed in the paragraph commencing at page 14, line 10, thereof.) As the result of the increase of magnitude of flux linkages, or flux linkage density, $B_\sigma$, along the stations, the ratio of the amplitude of induced voltage to the amplitude of torsional pulses progressively increases in the direction toward the terminal end of the line. This tends to compensate for the delay line attenuation effects which cause progressive decrease of the wave pulse amplitude as the wave travels along the line. The variation of stress-sensitivity along the line is chosen to as near as possible compensate for the wave pulse amplitude attenuation. This provides a more uniform amplitude level of output impulses in the serial wave train of induced voltages appearing across the ends of wire 12 as the single pulse travels past the magnet stations. In accordance with well known communication theory, providing a more uniform level of pulse amplitude in such a wave train is equivalent to improving the bandwidth of device 10 as a serial pulse code generator. It is to be noticed that the delay line attenuation includes mechanical attenuation effects produced by the structure for supporting the wire. For example, in the support arrangements of FIG. 2 the attenuation effects consist of mechanical loading of the wire by the notched bottom edges 36 of the magnet holding frames 34. This mechanical effect is also compensated for by the use of the wire having increasing stress-sensitivity.

The variation in stress-sensitivity along the length of wire 12 has a similar line attenuation compensating effect in the operation of device 10 as a serial pulse code detector. Assume that the serial binary wave train which appears at code generator output terminal 44 is fed into torquer 18. Since the time-impulse characteristic of the signal generated at the output of amplifier 26 has been reversed by signal wave reversal device 44, the torsional wave will match the impulse response characteristics of the delay line device 10 in the normal direction of propagation along the delay line. For example, the portion of the wave train attributable to magnet $M_1$, which was the last sequential component of the wave train appearing at the output of amplifier 26, is now the first sequential component of the signal wave train fed into the delay line, and is also reversed in impulse phase to now match the impulse detection response characteristic of the flux linkage circuit of magnet $M_1$. When the portions of the wave train pass through the flux linkage stations representing the corresponding digit of the predetermined code sequence, elemental induced voltage impulses of the same polarity will be simultaneously produced at all the flux circuit stations of magnet set 20. This in turn produces a voltage across the ends of wire 12 which is representative of the sum of the vector cross products of the magnitudes of the individual impulse components of the binary wave train, and the corresponding binary digit of the reference binary sequence. This in accordance with the explanation of the operation of the delay line device as a signal detector in the cited copending application. Again, the increase of stress-sensitivity along the line compensates for the delay line attenuation effects and linearizes the operation of the device as a vector cross product and summation device. In accordance with known theory of correlation detection systems, such linearization enables detection at larger noise to signal ratios. Also, improving the linearity of operation as a correlation detector permits use of longer delay lines, and in turn a larger number of flux circuit stations. This enables handling of longer code sequences, with their advantage of increased communication system sensitivity and selectivity.

In an alternate form of invention, the delay line device employs a tapered wire 48, FIG. 5, the taper shown in the drawing being greatly exaggerated. Wire 48 is made of a conventional magneto-elastic wire material which has been tapered to have a decreasing diameter along its different cross sections in the direction away from the end to which the torquer 18*a* is coupled. This may be done by means of controlled removal from an acid etching bath. Because of the taper, the relative amplitude of a wave impulse progressively increases as a wave propagates down the line, in comparison to what it would have been in the case of a uniform diametered wire. For an analytical explanation of this phenomenon see page 34, section B and page 47, section D "Physical Acoustics and the Properties of Solids," by Warren P. Mason, published by Van Nostrand, 1958. The progressive relative increase in torsional impulse amplitude results in a progressive relative increase in induced voltage, which tends to compensate in the output for delay line attenuation effects. Thus the tapered wire 48 effectively forms a delay line having increased stress sensitivity, like line 12. The principle of varying the delay line wire diameter may also be adapted for other special conditions. For example, where a magnetostrictive ribbon transducer 50, FIG. 6, only partially shown, is employed as a tap in the intermediate portion of a delay line device, the delay line wire 52 may be provided with a diameter decrease step 54 adjacent the transducer in the direction of wave propagation. Such a stepped diameter decrease tends to make induced voltage effects, of the type which are employed in the mode of operation of delay line devices of the character under description, equal on both sides of the intermediate transducer. Flux linkage stations providing the same magnetomotive force could be mounted on both sides of the intermediate transducer, and the stepped decrease in diameter would serve to equalize their contribution in producing induced voltage impulses.

Obviously many modifications and variations of the present invention are possible in the light of the above teachings.

What is claimed is:

1. In a torsional-wave delay line device, the combination, comprising:

a torsional mode delay line of magneto-elastic material, means coupled to an input of the line for converting an electrical input signal wave into a torsional strain wave for propagation along the line, a plurality of individual flux circuit stations, each cooperative with a different axial portion of the line to impress thereon a field of flux linkages which includes a unidirectional, generally axial component, said field of flux linkages co-acting with a torsional strain impulse propagating through said axial portion of the line to produce a variation in flux linkages of said field in accordance with the amplitude and polarity of the torsional strain impulse, utilization circuit means responsive to the variation in flux linkage experienced at the different flux circuit stations for producing the output of the device, means for an increase of flux stress-sensitivity along said delay line away from said input end to provide a monotonic increase in the magnitude of variation in flux linkage produced by a given amplitude level of energy wave impulse passing through the associated axial portion of the line at different cross sections along said line, whereby said variation in flux stress-sensitivity of the delay line compensates for the attenuation effects experienced by the torsional strain impulse in its propagation along the line.

2. A device in accordance with claim 1, and further of the type for use in the generation or detection of a predetermined serial wave train of binary impulses consisting of one or the other of a binary pair of forms of wave impulse representing the zero (0) and one (1) digits of a predetermined binary code sequence, the plurality of flux circuit stations corresponding in number to the number of digits in said binary code sequence, and providing a spacing of associated axial portions of the delay line and a polarity of flux within the associated axial portions of the delay line corresponding to spacing in time and binary form of the wave impulses of the wave train of said predetermined serial wave train, and arranged in a predetermined linear order of disposition in a predetermined one of either of opposite directions along the delay line, said predetermined linear order of disposition being in accordance with the sequential order in time of the individual wave impulses in the serial wave train of binary impulses.

3. A device in accordance with claim 1, said delay line comprising a wire having increasing stress-sensitivity at different cross sections therealong in the direction away from its input end.

4. A device in accordance with claim 1, said delay line comprising a wire having decreasing diameter at different cross sections therealong in the direction away from its input end.

5. A delay line comprising:

an elongated element of magneto-elastic material having a uniform outer diameter and a monotonically increasing stress-sensitivity characteristic from one end to the other.

6. A delay line according to claim 5, wherein:

the elongated element is an annealed element, having the monotonically increasing stress-sensitivity characteristics.

7. A delay line according to claim 5, wherein:

the elongated element is a work-hardened element, having the monotonically increasing stress-sensitvity characteristics.

8. A delay line according to claim 5, wherein:

the elongated element is a wire.

References Cited

UNITED STATES PATENTS

| | | | |
|---|---|---|---|
| 3,176,788 | 4/1965 | Harris | 333—30 |
| 3,261,002 | 7/1966 | Edmunds | 340—174 |
| 3,366,937 | 1/1968 | Fuller | 340—174 |
| 3,428,957 | 2/1969 | Hadden | 340—174 |

FOREIGN PATENTS

| | | |
|---|---|---|
| 1,362,895 | 7/1963 | France. |

BERNARD KONICK, Primary Examiner

K. E. KROSIN, Assistant Examiner

U.S. Cl. X.R.

310—26; 333—30